United States Patent
Fuse et al.

(10) Patent No.: US 12,148,912 B2
(45) Date of Patent: *Nov. 19, 2024

(54) VEHICLE THERMAL MANAGEMENT SYSTEM, HEAT TRANSFER MEDIUM AND METHOD FOR COOLING VEHICLE DRIVING BATTERY

(71) Applicant: DENSO CORPORATION, Kariya (JP)

(72) Inventors: Takuya Fuse, Kariya (JP); Kouji Inagaki, Kariya (JP); Ryuta Kobayakawa, Kariya (JP); Shinya Kasamatsu, Kariya (JP); Saori Nakajima, Kariya (JP)

(73) Assignee: DENSO CORPORATION, Kariya (JP)

(*) Notice: Subject to any disclaimer, the term of this patent is extended or adjusted under 35 U.S.C. 154(b) by 624 days.

This patent is subject to a terminal disclaimer.

(21) Appl. No.: 17/355,937

(22) Filed: Jun. 23, 2021

(65) Prior Publication Data
US 2021/0328286 A1    Oct. 21, 2021

Related U.S. Application Data

(63) Continuation-in-part of application No. PCT/JP2019/049398, filed on Dec. 17, 2019.

(30) Foreign Application Priority Data

Dec. 26, 2018  (JP) .................................. 2018-243349

(51) Int. Cl.
*H01M 10/625* (2014.01)
*B60H 1/00* (2006.01)
(Continued)

(52) U.S. Cl.
CPC ...... *H01M 10/663* (2015.04); *B60H 1/00278* (2013.01); *B60H 1/00328* (2013.01);
(Continued)

(58) Field of Classification Search
CPC ........... H01M 10/625; H01M 10/6556; H01M 10/6567; H01M 10/663; H01M 2220/20; B60H 1/00328; B60H 1/00278
See application file for complete search history.

(56) References Cited

U.S. PATENT DOCUMENTS

| 4,460,478 A | 7/1984 | Mohr et al. |
| 2002/0040896 A1 | 4/2002 | Ap |

(Continued)

FOREIGN PATENT DOCUMENTS

| DE | 102015004675 A1 * | 10/2016 |
| JP | S59-081376 A | 5/1984 |

(Continued)

OTHER PUBLICATIONS

U.S. Appl. No. 17/356,071, filed Jun. 23, 2021, Fuse et al.

*Primary Examiner* — Christian Roldan
*Assistant Examiner* — Robert Gene West
(74) *Attorney, Agent, or Firm* — Harness, Dickey & Pierce, P.L.C.

(57) ABSTRACT

A vehicle thermal management system mounted in a vehicle includes a vehicle driving battery, a liquid heat transfer medium, a heat receiver, and a radiator. The heat receiver causes the heat transfer medium to receive heat through heat exchange with the battery. The radiator causes the heat transfer medium to release the heat through heat exchange with an air outside of the vehicle. The heat transfer medium includes a liquid base material including water and an orthosilicic acid ester compatible with the liquid base material and does not include an ionic rust inhibitor. The orthosilicic acid ester is present, as a concentration of silicon, relative to a total mass of the heat transfer medium within a range between 2000 mass ppm, non-inclusive, and 10000 mass ppm, inclusive.

8 Claims, 2 Drawing Sheets

(51) Int. Cl.
H01M 10/6556 (2014.01)
H01M 10/6566 (2014.01)
H01M 10/6567 (2014.01)
H01M 10/663 (2014.01)

(52) U.S. Cl.
CPC ..... H01M 10/625 (2015.04); H01M 10/6556 (2015.04); H01M 10/6567 (2015.04); *H01M 2220/20* (2013.01)

(56) References Cited

U.S. PATENT DOCUMENTS

| | | |
|---|---|---|
| 2004/0028971 A1 | 2/2004 | Wenderoth et al. |
| 2004/0129920 A1 | 7/2004 | Wenderoth et al. |
| 2006/0027782 A1* | 2/2006 | Wenderoth ........ H01M 8/04029 252/71 |
| 2006/0033074 A1 | 2/2006 | Wenderoth et al. |
| 2006/0169507 A1 | 8/2006 | Inoue et al. |
| 2006/0192174 A1 | 8/2006 | Wenderoth et al. |
| 2006/0219975 A1 | 10/2006 | Wenderoth et al. |
| 2013/0233002 A1* | 9/2013 | Donaldson ............. F24F 1/035 62/99 |
| 2015/0217622 A1* | 8/2015 | Enomoto ............... F16K 11/076 62/244 |
| 2016/0226114 A1* | 8/2016 | Hartmann ........... C08G 18/7671 |
| 2016/0318499 A1 | 11/2016 | Yamanaka et al. |
| 2018/0178615 A1* | 6/2018 | Xia ...................... H01M 10/486 |
| 2018/0248238 A1* | 8/2018 | Pinon ................. H01M 10/613 |
| 2019/0348724 A1 | 11/2019 | Satoh |
| 2019/0352553 A1* | 11/2019 | Dietl ....................... C09K 5/10 |

FOREIGN PATENT DOCUMENTS

| | | |
|---|---|---|
| JP | 2000323146 A | 11/2000 |
| JP | 2001167778 A | 6/2001 |
| JP | 2004524652 A | 8/2004 |
| JP | 2005500649 A | 1/2005 |
| JP | 2006216303 A | 8/2006 |
| JP | 2014203739 A | 10/2014 |
| JP | 2015131597 A | 7/2015 |
| JP | 2018060594 A | 4/2018 |
| JP | 2018066279 A | 4/2018 |
| JP | 2018153074 A | 9/2018 |
| JP | 2018200785 A * | 12/2018 ........... B30B 15/041 |
| WO | WO-2018095759 A1 | 5/2018 |

* cited by examiner

VEHICLE THERMAL MANAGEMENT SYSTEM, HEAT TRANSFER MEDIUM AND METHOD FOR COOLING VEHICLE DRIVING BATTERY

CROSS REFERENCE TO RELATED APPLICATIONS

This application is a continuation-in-part application of International Patent Application No. PCT/JP2019/049398 filed on Dec. 17, 2019, which designated the U.S. and claims the benefit of priority from Japanese Patent Application No. 2018-243349 filed on Dec. 26, 2018. The entire disclosure of all of the above application is incorporated herein by reference.

TECHNICAL FIELD

The present disclosure relates to a vehicle thermal management system mounted in a vehicle, a heat transfer medium, and a method for cooling a vehicle driving battery.

BACKGROUND ART

A typical thermal management system for a vehicle includes a vehicle driving battery that supplies electric power to a traveling motor, a liquid heat transfer medium that transports heat from the battery, a heat receiver at which the heat transfer medium receives heat from the battery through heat exchange, and a radiator at which the heat transfer medium releases heat by exchanging the heat with air outside of the vehicle. In this system, the battery is cooled by transferring heat of the battery to the air outside of the vehicle via the heat transfer medium.

SUMMARY

In a first aspect of the present disclosure, a vehicle thermal management system mounted in a vehicle includes a vehicle driving battery, a liquid heat transfer medium, a heat receiver, and a radiator. The vehicle driving battery is configured to be charged with electric power supplied from an external power source and generates heat during charging and discharging. The liquid heat transfer medium transfers the heat received from the battery. The heat receiver that is configured to cause the heat transfer medium to receive the heat through heat exchange with the battery. The heat receiver includes a portion that is in contact with the heat transfer medium and is made of a material containing aluminum. The radiator that is configured to cause the heat transfer medium to release the heat through heat exchange with an air outside of the vehicle. The radiator includes a portion that is in contact with the heat transfer medium and is made of a material containing aluminum. The heat transfer medium includes a liquid base material including water and an orthosilicic acid ester compatible with the liquid base material and does not include an ionic rust inhibitor. The orthosilicic acid ester is present, as a concentration of silicon, relative to a total mass of the heat transfer medium within a range between 2000 mass ppm, non-inclusive, and 10000 mass ppm, inclusive.

In a second aspect of the present disclosure, a heat transfer medium for a vehicle thermal management system that includes a vehicle driving battery that is configured to be charged with electric power supplied from an external power source and generates heat during charging and discharging, a heat receiver that is configured to cause the heat transfer medium to receive the heat through heat exchange with the battery and a radiator that is configured to cause the heat transfer medium to release the heat through heat exchange with an air outside of a vehicle. The heat receiver includes a portion that is in contact with the heat transfer medium and is made of a material containing aluminum. The radiator includes a portion that is in contact with the heat transfer medium and is made of a material containing aluminum. The heat transfer medium includes a liquid base material including water and an orthosilicic acid ester compatible with the liquid base material. The heat transfer medium does not include an ionic rust inhibitor. The orthosilicic acid ester is present, as a concentration of silicon, relative to a total mass of the heat transfer medium within a range between 2000 mass ppm, non-inclusive, and 10000 mass ppm, inclusive.

In a third aspect of the present disclosure, a method for cooling a vehicle driving battery that generates heat during charging and discharging. The method includes circulating a heat transfer medium through a heat transfer medium circuit. The heat transfer medium includes a liquid base material including water and an orthosilicic acid ester compatible with the liquid base material. The orthosilicic acid ester is present, as a concentration of silicon, relative to a total mass of the heat transfer medium within a range between 2000 mass ppm, non-inclusive, and 10000 mass ppm, inclusive. The heat transfer medium does not include an ionic rust inhibitor. The method further includes causing, at a heat receiver including a portion that is in contact with the heat transfer medium and is made of a material containing aluminum, the heat transfer medium to receive the heat through heat exchange between the heat transfer medium and the battery that is configured to be charged with electric power supplied from an external power source. The method further includes causing, at a radiator including a portion that is in contact with the heat transfer medium and is made of a material containing aluminum, the heat transfer medium to release the heat through heat exchange between an air outside of a vehicle and the heat transfer medium having received the heat.

DESCRIPTION OF EMBODIMENTS

Figure 1:
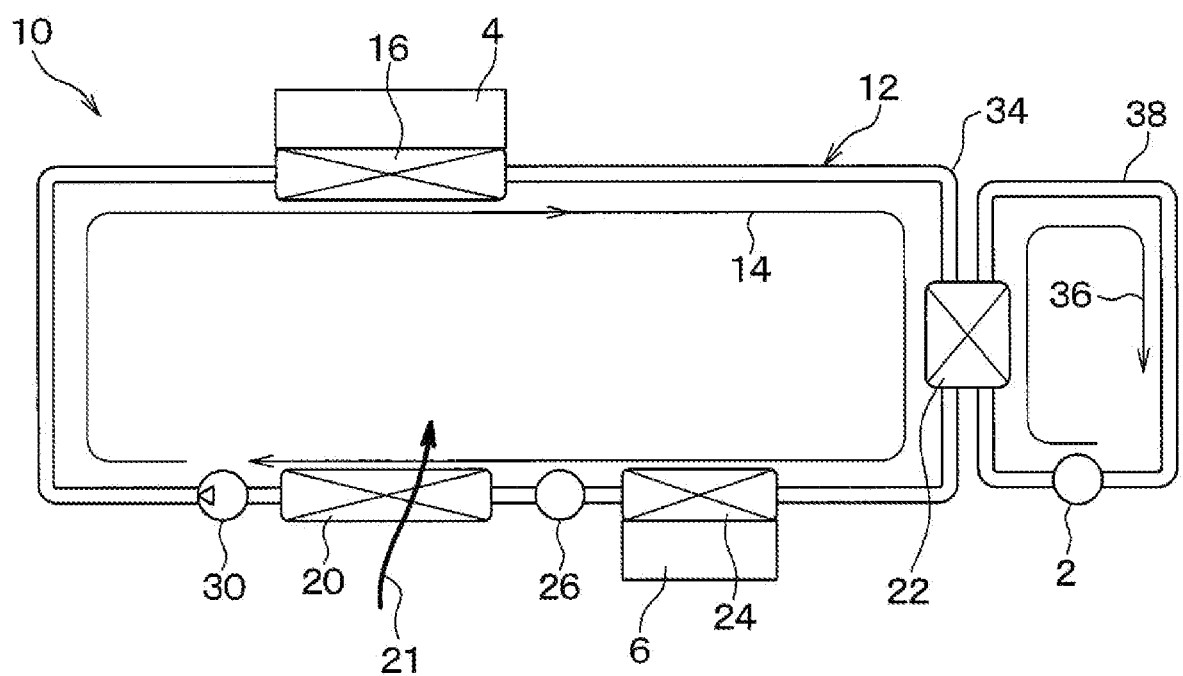
FIG. 1 is a schematic view showing an overall configuration of a vehicle thermal management system according to a first embodiment.
Figure 2:
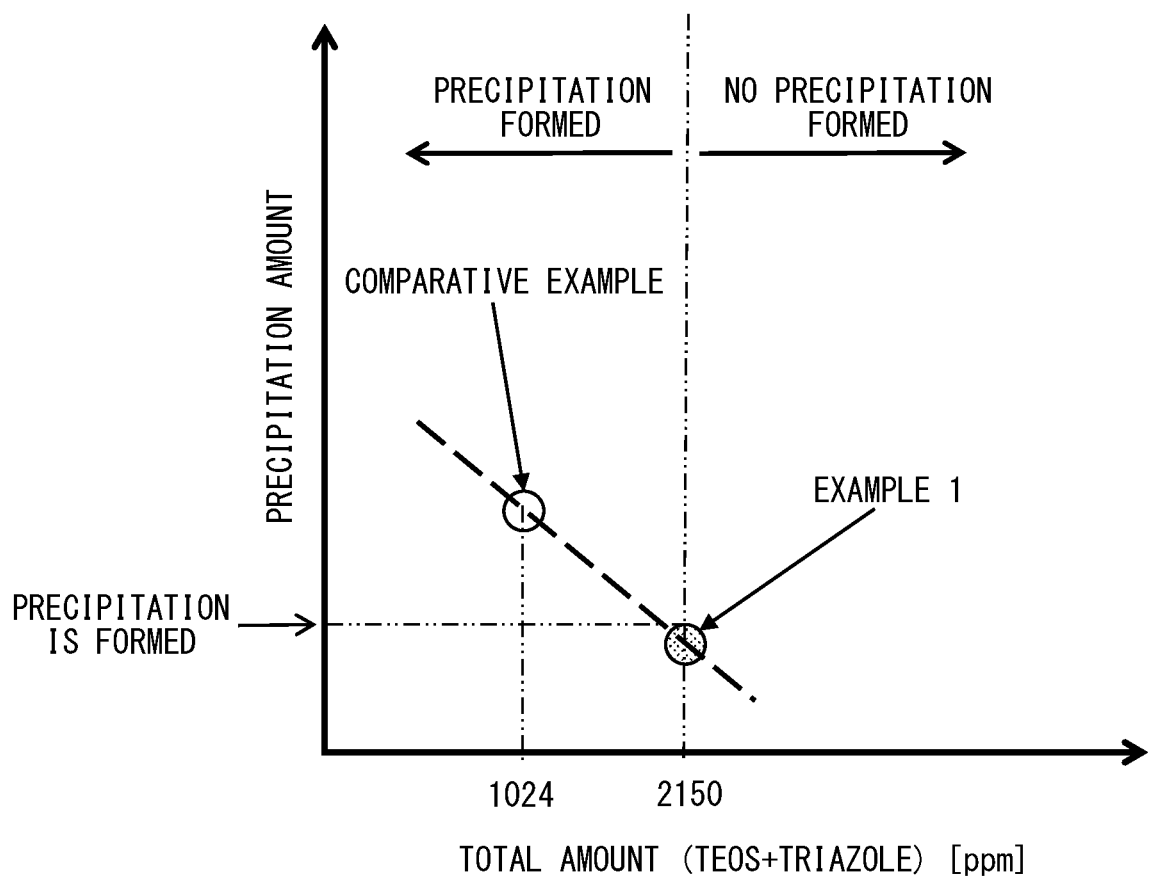
FIG. 2 is a graph showing a relation between the amount of precipitation and the total amount of an orthosilicic acid ester and a triazole in the heat transfer medium.

To begin with, a relevant technology will be described only for understanding the following embodiments.

In a vehicle thermal management system, if the heat transfer medium has a high electrical conductivity, a short circuit occurs when the heat transfer medium is leaked and comes into contact with the battery. As a countermeasure to this, the flow rate of the heat transfer medium flowing through the heat receiver needs to be decreased so as to prevent the heat transfer medium from leaking. Alternatively, it may be necessary to set a partition wall between the battery and the heat receiver so that the leaked heat transfer medium does not come into contact with the battery. As further another countermeasure, an installation space in the heat receiver for the battery needs to be small to reduce a contact area between the leaked heat transfer medium and the battery.

However, if these measures are taken, the amount of heat transferred from the battery to the heat transfer medium would be decreased. Therefore, the heat radiating function by the radiator cannot be sufficiently performed when cooling the battery. As a result, the radiator needs to increase in size.

One objective of the present disclosure is to provide a vehicle thermal management system that is capable of sufficiently performing a heat radiating function at a radiator when cooling a battery.

In one aspect of the present disclosure, a vehicle thermal management system includes a vehicle driving battery that generates heat during charging and discharging, a liquid heat transfer medium that transfers the heat received from the battery, a heat receiver that is configured to cause the heat transfer medium to receive the heat through heat exchange with the battery, and a radiator that is configured to cause the heat transfer medium to release the heat through heat exchange with an air outside of the vehicle. The heat transfer medium includes a liquid base material and an orthosilicic acid ester compatible with the base material and does not include an ionic rust inhibitor.

According to this, the heat transfer medium includes an orthosilicic acid ester and does not include an ionic rust inhibitor. Since the heat transfer medium includes the orthosilicic acid ester, the heat transfer medium has a rust inhibiting property. Therefore, the heat transfer medium need not include an ionic rust inhibitor. Since the heat transfer medium does not include an ionic rust inhibitor, the heat transfer medium has a low electrical conductivity and a high electric insulation property as compared with a heat transfer medium including an ionic rust inhibitor.

In this system, a heat transfer medium having a high electric insulation property is used. This eliminates the need for taking the above-mentioned measures against a liquid short circuit. Therefore, it is possible to avoid a situation where the amount of heat transferred from the battery to the heat transfer medium is reduced by taking the above-mentioned measures against the liquid short circuit. In other words, according to this system, the flow rate of the heat transfer medium can be set or the heat receiver can be used for the battery so that the amount of heat transferred from the battery to the heat transfer medium is increased without the concern of the short circuit. Therefore, the heat radiating function of the radiator can be sufficiently performed when cooling the battery.

Hereinafter, embodiments of the present disclosure will be described with reference to the drawings. In the following embodiments, the same or equivalent parts are denoted by the same reference numerals as each other, and explanations will be provided to the same reference numerals for simplifying descriptions.

First Embodiment

A vehicle thermal management system 10 shown in FIG. 1 is mounted in an electric vehicle. Hereinafter, the vehicle thermal management system 10 is simply referred to as a "system 10". The electric vehicle receives a driving force from a traveling electric motor 2. For example, the electric vehicle may be an electrically-powered vehicle, a plug-in hybrid vehicle, an electric two-wheeled vehicle, or the like. The number of wheels and usage of the electric vehicle are not limited to the above-described examples. The electric vehicle includes the traveling electric motor 2, a battery 4, and an inverter 6.

The traveling electric motor 2 is a motor generator that converts electric power supplied from the battery 4 into driving power for the vehicle, and also converts the driving power for the vehicle into electric power during deceleration of the vehicle. The traveling electric motor 2 generates heat during the power conversion between the driving power and the electric power.

The battery 4 is a battery for traveling the vehicle and is configured to supply electric power to the traveling electric motor 2. The battery 4 is charged with electric power supplied from the traveling electric motor 2 during deceleration of the vehicle. The battery 4 can be also charged with electric power supplied from an external power source (that is, a commercial power source) when the vehicle is stopped. The battery 4 generates heat during charging and discharging.

The inverter 6 is a power conversion device that converts electric power supplied from the battery 4 to the traveling electric motor 2 from direct current into alternating current. Further, the inverter 6 converts the electric power supplied from the traveling electric motor 2 to the battery 4 from alternating current to direct current. The inverter 6 generates heat when converting the electric power.

The system 10 includes the battery 4, a heat transfer medium 14, a heat receiver 16, an air heat exchanger 20, an oil heat exchanger 22, an inverter heat exchanger 24, an ion exchanger 26, a pump 30, and a hose 34.

The heat transfer medium 14 is liquid and carries the heat received from the battery 4. The heat transfer medium 14 includes a liquid base material and an orthosilicic acid ester and does not include an ionic rust inhibitor.

The base material is a base for the heat transfer medium 14. The liquid base material is used in a liquid form. As the base material, water containing a freezing point depression agent is used. Water is used since it has a large heat capacity, is inexpensive, and has a low viscosity. The freezing point depression agent is added to the water so that the water can be kept in a liquid form even when an environmental temperature falls below the freezing point. The freezing point depression agent dissolves in water and lowers the freezing point of the water. As the freezing point depression agent, an organic alcohol (e.g., alkylene glycol or a derivative thereof) is used. As the alkylene glycol, monoethylene glycol, monopropylene glycol, polyglycol, glycol ether, or glycerin may be used alone or as a mixture thereof. The freezing point depression agent is not necessarily limited to organic alcohol, and inorganic salts and the like may be used.

The orthosilicic acid ester is compatible with the base material. The orthosilicic acid ester is a compound for imparting a rust inhibitive property to the heat transfer medium 14. Since the heat transfer medium 14 includes the orthosilicic acid ester, the heat transfer medium 14 has a rust inhibitive property. Therefore, the heat transfer medium 14 need not include an ionic rust inhibitor.

As the orthosilicic acid ester, a compound represented by general formula (I) is used.

[Chemical Formula 1]

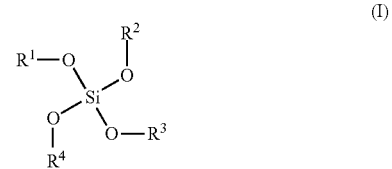

In general formula (I), each of the substituents R1 to R4 are the same or different from each other, and is an alkyl substituent having 1 to 20 carbon atoms, an alkenyl substituent having 2 to 20 carbon atoms, a hydroxyalkyl substituent having 1 to 20 carbon atoms, a substituted or unsubstituted aryl group having 6 to 12 carbon atoms, and/or a glycol ether-substituent of a formula- (CH2-CH2-O) n-R5. R5 represents hydrogen or alkyl having 1 to 5 carbon atoms. n represents any one of numbers of 1 to 5.

Typical examples of the orthosilicic acid ester may be pure tetraalkoxysilanes such as tetramethoxysilanes, tetraethoxysilanes, tetra (n-propoxy) silanes, tetra (isopropoxy) silanes, tetra (n-butoxy) silanes, tetras. (t-butoxy) silane, tetra (2-ethylbutoxy) silane, or tetra (2-ethylhexoxy) silane, as well as tetraphenoxysilane, tetra (2-methylphenoxy) silane, tetravinyloxysilane, tetraallyloxysilane, tetra (2-hydroxyethoxy) silane, tetra (2-ethoxyethoxy) silane, tetra (2-butoxyethoxy) silane, tetra (1-methoxy-2-propoxy) silane, tetra (2-methoxyethoxy) silane or tetra [2-[2-(2-methoxyethoxy) ethoxy] ethoxy] silane.

It is preferable to use, as the orthosilicic acid ester, a compound where in general formula (I) the substituents R1 to R4 are the same as each other and are the alkyl substituents having 1 to 4 carbon atoms or the glycol ether substituents of the formula-(CH2-CH2-O) n-R5, the substituent R5 is hydrogen, methyl, or ethyl, and n represents a number of 1, 2 or 3.

The orthosilicic acid ester is included in the heat transfer medium 14 so that the orthosilicic acid ester is present, as a concentration of silicon, relative to a total mass of the heat transfer medium 14 within a range of 1 to 10000 mass ppm. Preferably, the mass concentration of the silicon is set to fall within the range of 1 mass ppm, inclusive, to 2000 mass ppm, inclusive. Alternatively, the concentration of the silicon is preferably set to fall within the range of 2000 mass ppm, non-inclusive, to 10000 mass ppm, inclusive. The above orthosilicic acid ester is commercially available or can be produced by transesterifying 1 equivalent of tetramethoxysilane with 4 equivalents of a corresponding long chain alcohol or phenol and then by distilling off methanol.

Since the heat transfer medium 14 does not include an ionic rust inhibitor, the heat transfer medium 14 has electrical conductivity that is lower than that of a heat transfer medium containing an ionic rust inhibitor. The electrical conductivity of the heat transfer medium 14 is set to be 50 µS/cm or less, preferably fall within the range of 1 µS/cm, inclusive, to 5 µS/cm, inclusive. An engine cooling water used for cooling a vehicle engine is an example of a heat transfer medium containing an ionic rust inhibitor and a liquid base material including water. Typically, an engine cooling water has electrical conductivity of 4000 µS/cm or more. In this way, the heat transfer medium containing an ionic rust inhibitor has high electrical conductivity and therefore does not have an electrical insulation property.

The heat transfer medium 14 may include an azole derivative as a rust inhibitor in addition to the orthosilicic acid ester.

The heat receiver 16 receives heat from the heat transfer medium 14 by exchanging heat with the battery 4. Heat is transferred from the battery 4 to the heat transfer medium 14 via constituting members of the heat receiver 16. The heat receiver 16 may be configured so that the battery 4 is immersed in the heat transfer medium 14 and heat is directly transferred from the battery 4 to the heat transfer medium 14.

The air heat exchanger 20 is a heat radiator that is configured to cause the heat transfer medium 14 to release heat by exchanging heat with air 21 outside of the vehicle. The air 21 is supplied to the air heat exchanger 20 by operating a blower (not shown).

The oil heat exchanger 22 is a heat exchanger that is configured to cause the heat transfer medium 14 to receive heat from the oil 36 through heat exchange with the oil 36 that has received heat from the travelling electric motor 2. The oil heat exchanger 22 is connected to an oil passage portion of the travelling electric motor 2 via a pipe 38 through which the oil 36 flows.

The inverter heat exchanger 24 is a heat exchanger that is configured to cause the heat transfer medium 14 to receive heat through heat exchange with the inverter 6. Each of the heat receiver 16, the air heat exchanger 20, the oil heat exchanger 22, and the inverter heat exchanger 24 has a portion that is in contact with the heat transfer medium 14 and is made of a material containing aluminum.

The ion exchanger 26 is configured to capture ions generated in the heat transfer medium 14. The ion exchanger 26 includes an ion exchanging member and a filtering member. As the ion exchanging member, an anionic resin or a cationic resin may be used. As the filtering member, an activated carbon filter may be used.

The pump 30 is a fluid mechanism that feeds the heat transfer medium 14. The hose 34 is a flow passage forming member that forms a flow passage through which the heat transfer medium 14 flows.

The heat receiver 16, the air heat exchanger 20, the oil heat exchanger 22, the inverter heat exchanger 24, the ion exchanger 26, and the pump 30 are connected to each other through the hose 34. As a result, the heat transfer medium circuit 12 in which the heat transfer medium 14 circulates is formed. Specifically, the heat receiver 16, the oil heat exchanger 22, the inverter heat exchanger 24, the ion exchanger 26, the air heat exchanger 20, and the pump 30 are connected to each other in this order to form an annular shape.

When the pump 30 operates, the heat transfer medium 14 circulates through the heat receiver 16, the oil heat exchanger 22, the inverter heat exchanger 24, the ion exchanger 26, the air heat exchanger 20, and the pump 30 in this order. At this time, the heat transfer medium 14 receives heat from the battery 4 at the heat receiver 16. The heat transfer medium 14 receives heat from the oil 36 at the oil heat exchanger 22. The heat transfer medium 14 receives heat from the inverter 6 at the inverter heat exchanger 24. The heat transfer medium 14 releases heat to the air 21 outside of the vehicle. As a result, the battery 4, the electric motor 2, and the inverter 6 are cooled.

Further, when the heat transfer medium 14 flows through the heat transfer medium circuit 12, ions are generated in the heat transfer medium 14 for various reasons. The generated ions are captured by the ion exchanger 26.

Nest, advantages of the present embodiment will be described.

(1) In the present embodiment, the system 10 includes the battery 4, the heat transfer medium 14, the heat receiver 16, and the air heat exchanger 20. The heat transfer medium 14 includes the liquid base material and the orthosilicic acid ester and does not include an ionic rust inhibitor.

Accordingly, since the heat transfer medium includes the orthosilicic acid ester, the heat transfer medium has a rust inhibitive property. Therefore, the heat transfer medium 14 need not include an ionic rust inhibitor. Since this heat transfer medium 14 does not include an ionic rust inhibitor, the electrical conductivity of the heat transfer medium is low and the electric insulation is high as compared with a heat transfer medium containing an ionic rust inhibitor.

In this system 10, the heat transfer medium 14 having high electric insulation property is used. This eliminates the need for taking the above-mentioned measures against a liquid short circuit. Therefore, it is possible to avoid a situation where the amount of heat transferred from the battery 4 to the heat transfer medium 14 is reduced by taking the above-mentioned measures against the liquid short circuit. In other words, according to this system 10, the flow rate of the heat transfer medium 14 can be set and/or the heat receiver 16 can be used for the battery 4 so that the amount of heat transferred from the battery 4 to the heat transfer medium 14 can be increased without a concern of occurring the short circuit. Therefore, the heat radiating function of the heat exchanger 20 can be sufficiently performed when cooling the battery 4.

Therefore, according to the present embodiment, the battery 4 can be cooled during quick charging using an external power source. That is, when the required time for quick charging of the battery 4 is shortened, the amount of heat generated by the battery 4 increases. According to the present embodiment, since the heat radiating function of the air heat exchanger 20 can be sufficiently performed, the required time for quick charging of the battery 4 can be shortened.

(2) The system 10 further includes the oil heat exchanger 22 and the inverter heat exchanger 24. According to this, the traveling electric motor 2 and the inverter 6 can be cooled using the heat transfer medium 14.

(3) Each of the heat receiver 16, the air heat exchanger 20, the oil heat exchanger 22, and the inverter heat exchanger 24 includes the portion that is in contact with the heat transfer medium 14 and is made of a material including aluminum. The base material of the heat transfer medium 14 includes water.

When the portion in contact with the heat transfer medium 14 is made of a material containing aluminum and the heat transfer medium 14 includes water, hydrogen may be generated due to electrochemical reaction of the water at the portion in contact with the heat transfer medium 14. However, since the heat transfer medium 14 includes the orthosilicic acid ester, generation of the hydrogen can be suppressed. This has been confirmed through experiments conducted by the inventors of the present disclosure. It should be noted that all the heat receiver 16, the air heat exchanger 20, the oil heat exchanger 22, and the inverter heat exchanger 24 do not necessarily include the portion in contact with the heat transfer medium 14, but at least one of them includes the portion that is in contact with the heat transfer medium 14 and is made of a material containing aluminum.

(4) The system 10 further includes the ion exchanger 26. Accordingly, even if ions are generated in the heat transfer medium 14, the ions can be captured by the ion exchanger 26. Therefore, the high electric insulation of the heat transfer medium 14 can be maintained.

Second Embodiment

In the first embodiment, the heat transfer medium 14 does not include an ionic rust inhibitor. However, as long as the heat transfer medium 14 has an electric insulation property, the heat transfer medium 14 may contain an ionic rust inhibitor. For example, nitrite, molybdate, chromate, phosphonate, phosphate, sebacic acid, and triazole compounds may be used as the ionic rust inhibitor. The phrase "the heat transfer medium 14 has an electric insulation property" used herein means that the heat transfer medium 14 has electrical conductivity of 500 µS/cm or less. This electrical conductivity is a measured value at a room temperature, for example, 25° C. According to experimental results conducted by the present inventors, when the electrical conductivity of the heat transfer medium 14 is 500 µS/cm or less, it is possible to avoid occurrence of short circuit even when the heat transfer medium 14 is leaked and comes into contact with the battery 4. In order to avoid occurrence of the short circuit, the electrical conductivity of the heat transfer medium 14 is preferably 100 µS/cm or less, and more preferably 10 µS/cm or less.

Even in this case, since the heat transfer medium 14 includes the orthosilicic acid ester, the heat transfer medium 14 has a rust inhibitive property. Therefore, the amount of the ionic rust inhibitor included in the heat transfer medium 14 with the orthosilicic acid ester can be reduced as compared with the heat transfer medium 14 including the ionic rust inhibitor without the orthosilicic acid ester (e.g., engine cooling water). That is, the electrical conductivity of the heat transfer medium 14 can be lowered as compared with the heat transfer medium 14 with an ionic rust inhibitor but without the orthosilicic acid ester. As a result, an electrical insulation property can be given to the heat transfer medium 14.

Furthermore, the inventors of the present disclosure have found the following facts through experiments. As described above, the orthosilicic acid ester in the heat transfer medium works to prevent ions from generating from the heat receiver 16 or the air heat exchanger 20, each of which includes a portion made of a material containing aluminum. However, if the amount of the orthosilicic acid ester in the heat transfer medium increases, a precipitation of the orthosilicic acid ester would be formed in the heat transfer medium. In view of this, the inventors of the present disclosure add a triazole compound to the heat transfer medium as an ion rust inhibitor. As a result, the triazole compound is found to work, in addition to as an ion rust inhibitor, as a precipitation inhibitor (i.e., prevent the orthosilicic acid ester from precipitating in the heat transfer medium).

<Experiment>

Here, the inventor of the present disclosure have conducted an experiment to identify an appropriate amount of a triazole compound relative to the orthosilicic acid ester in the heat transfer medium. In Table 1 below, Example 1 shows a heat transfer medium according to the present embodiment. The heat transfer medium of Example 1 includes, as an orthosilicic acid ester, a tetraetoxysilane (TEOS) in an amount of 150 mass ppm as silicon atoms based on the total amount of the heat transfer medium. The heat transfer medium of Example 1 also includes a triazole of 2000 mass ppm relative to the entire heat transfer medium. Thus, the total amount of the orthosilicic acid ester as silicon atoms and the triazole based on the total amount of the heat transfer medium of Example 1 is 2150 mass ppm. On the contrary, Comparative Example in the table shows a heat transfer medium including an orthosilicic acid ester in an amount of 24 mass ppm as silicon atoms and a triazole of 1000 mass ppm relative to the entire heat transfer medium. The total amount of the orthosilicic acid ester as silicon atoms and the triazole of Comparative Example is 1024 mass ppm.

TABLE 1

| | Composition | | |
|---|---|---|---|
| | TEOS (silicon) | Triazole | Total |
| Example 1 | 150 ppm | 2000 ppm | 2150 ppm |
| Comparative Example | 24 ppm | 1000 ppm | 1024 ppm |

FIG. 4 shows a graph indicating a relation between a precipitation amount and the total amount of the silicon of the orthosilicic acid ester and the triazole. As shown in FIG. 4, a precipitation of the orthosilicic acid ester is formed in the heat transfer medium according to Comparative Example. On the other hand, no precipitation of the orthosilicic acid ester is formed in the heat transfer medium according to Example 1. According to the experimental results, if the total amount of the orthosilicic acid ester as silicon atoms and the triazole is 2150 mass ppm or more relative to the entire heat transfer medium, formation of a precipitation of the orthosilicic acid ester can be prevented.

Furthermore, according to the experimental result, it is preferable if the mass concentration of triazole relative to the entire heat transfer medium is greater than the mass concentration of silicon of the orthosilicic acid ester relative to the entire heat transfer medium. In the second embodiment, since an ion rust inhibitor such as a trizole is contained in the heat transfer medium. Thus. the amount of the orthosilicic acid ester in the heat transfer medium can be reduced. For example, the mass concentration of the orthosilicic acid ester as silicon atoms relative to the entire heat transfer medium is preferably within a range between 40 mass ppm, non-inclusive, and 150 mass ppm, inclusive.

Other Embodiments (1) The order of connecting the heat receiver 16, the air heat exchanger 20, the oil heat exchanger 22, and the inverter heat exchanger 24, which are components of the heat transfer medium circuit 12, is not necessarily limited to the order shown in FIG. 1, and the order can be changed.

(2) In the first embodiment, the system 10 includes the oil heat exchanger 22 and the inverter heat exchanger 24. However, the system 10 may include only either one of the heat exchangers 22, 24. Alternatively, in the system 10, the heat exchangers 22 and 24 may be eliminated.

(3) In each of the above-described embodiments, the water containing the freezing point depression agent is used as the base material of the heat transfer medium 14. However, an organic solvent may be used as the base material of the heat transfer medium 14. When the heat transfer medium 14 includes an organic solvent, gases are generated from the heat transfer medium 14 when the organic solvent is vaporized. In this case, the gases generated when the organic solvent is vaporized may work as the hydrogen gases described in each of the above-described embodiments. Furthermore, in this case, the portion of each of the heat receiver 16, the air heat exchanger 20, the oil heat exchanger 22, and the inverter heat exchanger 24 that is in contact with the heat transfer medium 14 may be not necessarily made of a material containing aluminum.

(4) The present disclosure is not limited to the foregoing description of the embodiments and can be modified. The present disclosure may also be varied in many ways. Such variations are not to be regarded as departure from the disclosure, and all such modifications are intended to be included within the scope of the disclosure. The above embodiments are not independent of each other, and can be appropriately combined except when the combination is obviously impossible. Further, in each of the above-mentioned embodiments, it goes without saying that components of the embodiment are not necessarily essential except for a case in which the components are particularly clearly specified as essential components, a case in which the components are clearly considered in principle as essential components, and the like. A quantity, a value, an amount, a range, or the like, if specified in the above-described example embodiments, is not necessarily limited to the specific value, amount, range, or the like unless it is specifically stated that the value, amount, range, or the like is necessarily the specific value, amount, range, or the like, or unless the value, amount, range, or the like is obviously necessary to be the specific value, amount, range, or the like in principle. Further, in each of the embodiments described above, when materials, shapes, positional relationships, and the like, of the components and the like, are mentioned, they are not limited to these materials, shapes, positional relationships, and the like, unless otherwise specified and unless limited to specific materials, shapes, positional relationships, and the like.

(Overview)

According to a first aspect described in a part or the whole of each of the embodiments, the vehicle thermal management system includes the vehicle driving battery that generates heat during charging or discharging, the liquid heat transfer medium that transfers heat from the battery, a heat receiver that causes the heat transfer medium to receive heat from the battery through heat exchange, and a radiator that causes the heat transfer medium to release the heat through heat exchange with an air outside of the vehicle. The heat transfer medium includes a liquid base material and an orthosilicic acid ester compatible with the base material and does not include an ionic rust inhibitor.

According to a second aspect, the vehicle thermal management system further includes the oil heat exchanger that causes the heat transfer medium to further receive heat through heat exchange with an oil for cooling a motor generator. Accordingly, the motor generator can be cooled using the heat transfer medium.

According to a third aspect, the vehicle thermal management system further includes an inverter heat exchanger that causes the heat transfer medium to further receive heat through heat exchange with an inverter. Accordingly, the inverter can be cooled using the heat transfer medium.

According to a fourth aspect, at least one of the heat receiver and the radiator includes a portion that is in contact with the heat transfer medium and is made of a material containing aluminum. The base material includes water.

According to a fifth aspect, the oil heat exchanger includes a portion that is in contact with the heat transfer medium and is made of a material containing aluminum. The base material includes water.

According to a sixth aspect, the inverter heat exchanger includes a portion that is in contact with the heat transfer medium and is made of a material containing aluminum. The base material includes water.

When the portion in contact with the heat transfer medium is made of a material containing aluminum and the heat transfer medium includes water, hydrogen may be generated due to electrochemical reaction of water at the portion in contact with the heat transfer medium. However, according to the fourth to sixth aspects, since the heat transfer medium contains the orthosilicic acid ester, generation of the hydrogen can be suppressed.

According to a seventh aspect, the vehicle thermal management system further includes an ion exchanger that is configured to capture ions generated in the heat transfer medium. Accordingly, even if ions are generated in the heat transfer medium, the heat transfer medium can maintain its high electric insulation property.

According to an eighth aspect, the vehicle thermal management system includes a vehicle driving battery that generates heat during charging or discharging, a liquid heat transfer medium that transfers heat received from the battery, a heat receiver that causes the heat transfer medium to receive heat from the battery through heat exchange, and a radiator that causes the heat transfer medium to release the heat through heat exchange with an air outside of the vehicle. The heat transfer medium includes a liquid base material and an orthosilicic acid ester compatible with the base material and has an electric insulation property.

Accordingly, the heat transfer medium includes an orthosilicic acid ester and has an electric insulation property. Since the heat transfer medium includes the orthosilicic acid ester, the heat transfer medium has a rust inhibiting property. Therefore, the amount of the ionic rust inhibitor included in the heat transfer medium with the orthosilicic acid ester can be reduced as compared with a heat transfer medium including the ionic rust inhibitor without the orthosilicic acid ester. That is, the electrical conductivity of the heat transfer medium can be lowered as compared with the heat transfer medium with an ionic rust inhibitor. As a result, an electrical insulation property can be given to the heat transfer medium.

In this system, a heat transfer medium having an electric insulation property is used. As a result, the need for taking the above-mentioned measures against a liquid short circuit is eliminated. Therefore, it is possible to avoid a situation where the amount of heat transferred from the battery to the heat transfer medium is reduced by taking the above-mentioned measures against the liquid short circuit. In other words, according to this system, the flow rate of the heat transfer medium can be set or the heat receiver can be used for the battery so that the amount of heat transferred from the battery to the heat transfer medium is increased without the concern of the short circuit. Therefore, the heat radiating function of the radiator can be sufficiently performed when cooling the battery.

Further, according to a ninth aspect, the heat transfer medium has electrical conductivity of 500 µS/cm or less. As described above, the heat transfer medium has an electric insulation property with the electrical conductivity of 500 µS/cm or less. As a result, it is possible to avoid occurrence of a liquid short circuit even when the heat transfer medium is leaked and comes into contact with the battery.

The invention claimed is:

1. A vehicle thermal management system mounted in a vehicle, the system comprising:
    a vehicle driving battery that is configured to be charged with electric power supplied from an external power source and generates heat during charging and discharging;
    a liquid heat transfer medium that transfers the heat received from the battery;
    a heat receiver that is configured to cause the liquid heat transfer medium to receive the heat through heat exchange with the battery, the heat receiver including a portion that is in contact with the liquid heat transfer medium and is made of a material containing aluminum; and
    a radiator that is configured to cause the liquid heat transfer medium to release the heat through heat exchange with an air outside of the vehicle, the radiator including a portion that is in contact with the liquid heat transfer medium and is made of a material containing aluminum, wherein
    the liquid heat transfer medium includes a liquid base material including water, an orthosilicic acid ester compatible with the liquid base material, and an azole derivative and has an electric insulation property, and
    a total amount of the orthosilicic acid ester and a triazole as the azole derivative is at least 2,150 mass ppm relative to the entire liquid heat transfer medium.

2. The vehicle thermal management system according to claim 1, further comprising
    an oil heat exchanger that is configured to cause the liquid heat transfer medium to receive heat through heat exchange with an oil for cooling a motor generator, wherein
    the oil heat exchanger includes a portion that is in contact with the liquid heat transfer medium and is made of a material containing aluminum.

3. The vehicle thermal management system according to claim 1, further comprising
    an inverter heat exchanger that is configured to cause the liquid heat transfer medium to receive heat through heat exchange with an inverter, wherein
    the inverter heat exchanger includes a portion that is in contact with the liquid heat transfer medium and is made of a material containing aluminum.

4. The vehicle thermal management system according to claim 1, further comprising
    an ion exchanger that is configured to capture ions generated in the liquid heat transfer medium.

5. A heat transfer medium for a vehicle thermal management system, the vehicle thermal management system including (i) a vehicle driving battery configured to be charged with electric power supplied from an external power source and generates heat during charging and discharging, (ii) a heat receiver configured to cause the heat transfer medium to receive the heat through heat exchange with the battery, the heat receiver including a portion that is in contact with the heat transfer medium and is made of a material containing aluminum, and (iii) a radiator that is configured to cause the heat transfer medium to release the heat through heat exchange with an air outside of a vehicle, the radiator including a portion that is in contact with the heat transfer medium and is made of a material containing aluminum, the heat transfer medium comprising:
    a liquid base material including water;
    an orthosilicic acid ester compatible with the liquid base material; and
    an azole derivative; wherein
    the heat transfer medium has an electric insulation property, and
    a total amount of the orthosilicic acid ester and a triazole as the azole derivative is at least 2,150 mass ppm relative to the entire heat transfer medium.

6. A method for cooling a vehicle driving battery that generates heat during charging and discharging, the method comprising:
    circulating a heat transfer medium through a heat transfer medium circuit, the heat transfer medium comprising:
    a liquid base material including water;
    an orthosilicic acid ester compatible with the liquid base material; and
    an azole derivative, wherein a total amount of the orthosilicic acid ester and a triazole as the azole derivative is at least 2,150 mass ppm relative to the entire heat transfer medium, wherein the heat transfer medium has an electric insulation property;

causing, at a heat receiver including a portion that is in contact with the heat transfer medium and is made of a material containing aluminum, the heat transfer medium to receive the heat through heat exchange between the heat transfer medium and the battery that is configured to be charged with electric power supplied from an external power source; and causing, at a radiator including a portion that is in contact with the heat transfer medium and is made of a material containing aluminum, the heat transfer medium to release the heat through heat exchange between an air outside of a vehicle and the heat transfer medium having received the heat.

7. The method according to claim 6, further comprising causing, at an oil heat exchanger including a portion that is in contact with the heat transfer medium and is made of a material containing aluminum, the heat transfer medium to further receive the heat through heat exchange between the heat transfer medium and an oil for cooling a motor generator.

8. The method according to claim 6, further comprising causing, at an inverter heat exchanger including a portion that is in contact with the heat transfer medium and is made of a material containing aluminum, the heat transfer medium to further receive the heat through heat exchange between the heat transfer medium and an inverter.

* * * * *